United States Patent [19]

Wetzig et al.

[11] Patent Number: 5,296,517
[45] Date of Patent: Mar. 22, 1994

[54] PROCESS FOR CONTINUOUS CONTROL OF THE CELL NUMBER OF POLYURETHANE FOAMS

[75] Inventors: Ulrich Wetzig, Rudesheim; Manfred Hohenhorst, Rot an der Rot, both of Fed. Rep. of Germany

[73] Assignee: Koepp Aktiengesellschaft, Fed. Rep. of Germany

[21] Appl. No.: 41,592

[22] Filed: Apr. 5, 1993

[30] Foreign Application Priority Data

Apr. 3, 1992 [DE] Fed. Rep. of Germany ....... 4211080

[51] Int. Cl.$^5$ ............................................. C08G 14/00
[52] U.S. Cl. .................................... 521/155; 521/170; 521/917; 222/55; 222/57
[58] Field of Search ......................... 521/155, 170, 917; 222/55, 57

[56] References Cited

U.S. PATENT DOCUMENTS 4,526,907 7/1985 Thiele et al. ...................... 521/917

FOREIGN PATENT DOCUMENTS

| 332032 | 9/1989 | European Pat. Off. . |
| 344501 | 12/1989 | European Pat. Off. . |
| 379015 | 7/1990 | European Pat. Off. . |
| 2446089 | 4/1976 | Fed. Rep. of Germany . |
| 3920994 | 7/1988 | Fed. Rep. of Germany . |
| 2292523 | 6/1976 | France . |

OTHER PUBLICATIONS

WO 92/01738 (Feb. 6, 1992).

*Primary Examiner*—Maurice J. Welsh
*Attorney, Agent, or Firm*—Wegner, Cantor, Mueller & Player

[57] ABSTRACT

The process for continuous control of cell number in the production of polyurethane foams from polyols, isocyanates and water, where mixing the components is effected in a mixing head with adjustable injection pressure and adjustable mixing chamber pressure, consists in that immediately prior to entering the mixing head the gas content of the isocyanate is continuously increased or reduced.

8 Claims, 2 Drawing Sheets

PROCESS FOR CONTINUOUS CONTROL OF THE CELL NUMBER OF POLYURETHANE FOAMS

BACKGROUND OF THE INVENTION

This invention is directed to a process for continuous control of cell number in the production of polyurethane foams from polyols, isocyanates and water, where mixing the components is effected in a mixing head with adjustable injection pressure and adjustable mixing chamber pressure.

From DE-A-24 40 022, a process and a device is known for the production of insulation and lightweight building materials from cold- or hot-setting reaction and/or condensation resins, where the resin is loaded with the required amount of propellant in a pressure container, and the foam is generated by depressurizing the mixtures. Here, loading of resin with propellant is accelerated by increasing the gas/liquid boundary surface, omitting moving stirring assemblies, whereby a foam is formed from the one component and the propellant by mere mechanical means. This preformed foam then is mixed with the second component. Final foam production then is effected by depressurizing and curing the mixture.

From DE-A-39 20 994, there is known an improved device for producing a reaction mixture from at least two components for the production of foams, where at least one of the feed lines has a gas feed device with a gas feed gauge and a volume flow counter. Here, the gas feed device consists of a special static mixer, and gas feed is controlled by a valve. Here again, foam production is exclusively effected by means of gas fed in the required amount.

With polyurethane foams, foam formation is not effected by added gases or propellants but by carbon dioxide as a propellant gas which is formed from the isocyanate and water, where, incidentally, polyaddition of isocyanate and polyol occurs. It has been common so far to vary the cell number by varying the pressure of isocyanate injection into the mixing chamber and/or the mixing chamber pressure itself. In order to obtain fine-pored foams, the injection pressure is increased and the mixing chamber pressure is decreased. In order to obtain coarse cells, the isocyanate injection pressure is decreased and the mixing chamber pressure is increased. However, such measures are limited particularly due to sealing problems occurring at the stirrer shaft. Furthermore, these adjustments are non-reproducible and must be re-optimized frequently.

Another measure for producing more coarse-cell foams of polyurethane consists in degassing the isocyanate employed. This is effected, for example, by prolonged storage in a storage tank, preferably at reduced pressure. It is a measure which requires a lot of time and space and thus is correspondingly costly. The amount of gas dissolved in the isocyanate is very low relative to the carbon dioxide formed but apparently acts as a nucleator for gas bubbles and thus has an effect on the cell size of the foams. Immediately after production, the isocyanate contains little or no dissolved gases but depending on time, absorbs indefinite amounts of air by dissolution on storage and transport. Thus, in the user's process tank, there are irregular layers of isocyanate with varying concentrations of air, possibly resulting in unpredictable variations in cell number during foam production.

SUMMARY OF THE INVENTION

It is an object of the invention to continuously control the cell number during production of polyurethane foams from polyols, isocyanates and water, where mixing the components still is to be effected in a mixing head with adjustable injection pressure and adjustable mixing chamber pressure.

Now, it has been found that this problem can be solved in a particularly simple and elegant manner by continuously increasing or decreasing the gas content of the isocyanate prior to entering the mixing head. Preferably, such increase or reduction of gas content of the isocyanate is effected in a flow chamber with adjustable excess or reduced pressure, with the isocyanate flowing through the flow chamber as a thin film.

DETAILED DESCRIPTION

Figure 1:
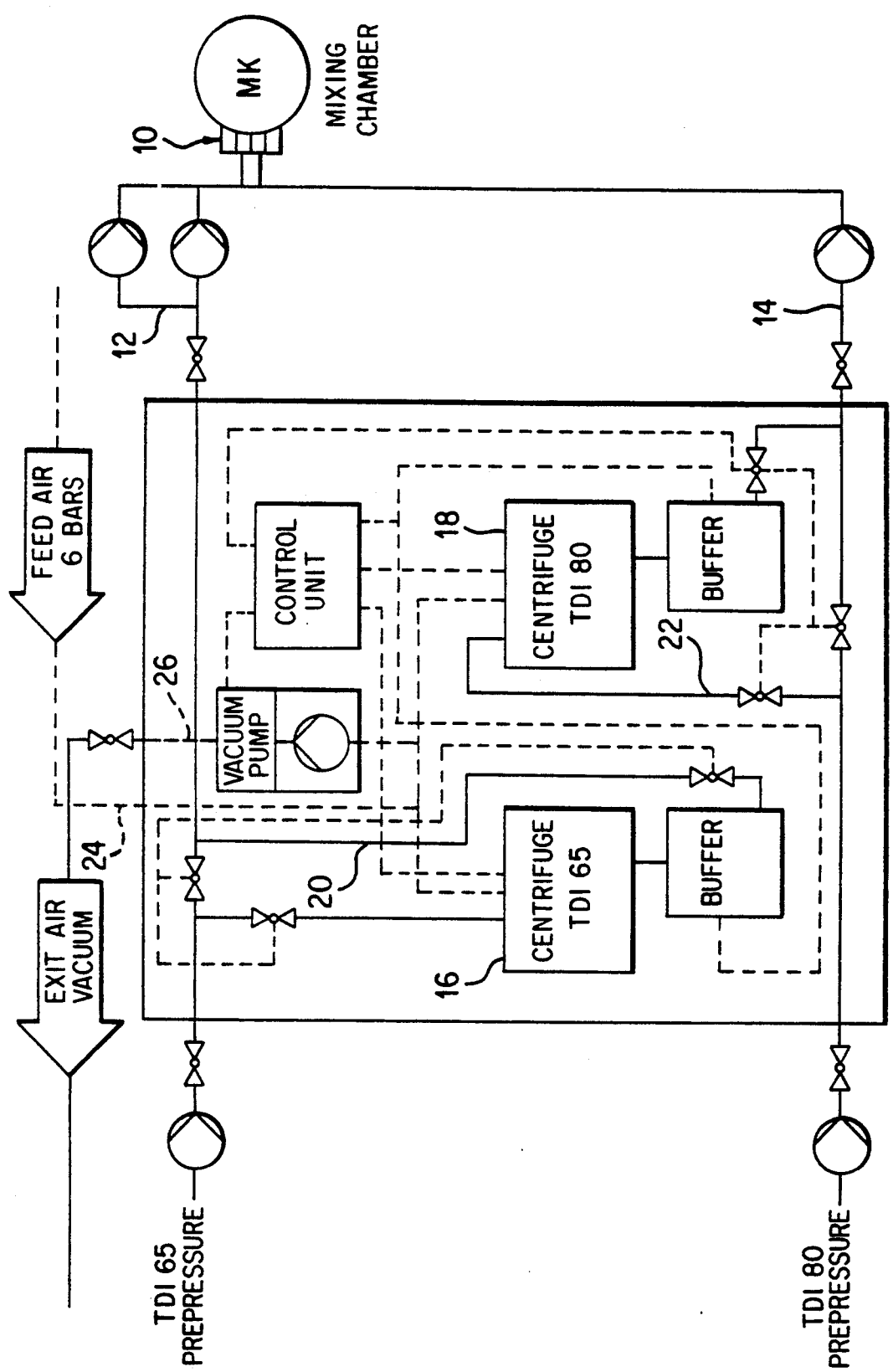
FIG. 1 is a schematic depiction of a system for supplying isocyanate to a mixing chamber for foam production according to the present invention.

The present invention provides a process for controlling the cell size of polyurethane foams produced in a mixing head from isocyanate, polyol or other compound having two hydrogens reactive with isocyanate groups, and water by increasing or decreasing the as content of the isocyanate before it is supplied to the mixing head. It is particularly preferred to effect increase or reduction of the gas content of the isocyanate by designing the flow chamber as a centrifuge having several coaxial ring chambers.

Such a result was not predictable in this form since, while it is known that viscous liquids may be degassed under vacuum and such degassing is more rapid when the surface of the liquid is increased, it could not be predicted that under the same conditions gas can be rapidly introduced into the liquid as well by increasing the pressure.

Increasing the surface may also be effected by spraying the liquid, for instance. Under such conditions, it was not possible to load the liquid with gas. Far better and more reproducible results are obtained when the isocyanate is flowing as a thin film through a flow chamber, with residence time and film thickness affecting degassing and loading with gas, respectively. Optimum results are obtained in particular when the flow chamber is designed as a centrifuge having several coaxial ring chambers. Such centrifuges are described in Fat Sci. Technol., Vol. 90, pp. 529-532, and shown in FIG. 2, as discussed below.

The present invention utilizes known components for the formation of isocyanate-based foams. Such foams are produced from isocyanate, a compound having at least two hydrogens reactive toward isocyanate groups, and water, with other additives to achieve desired effects.

Examples of useful isocyanates include aliphatic, cycloaliphatic, araliphatic, aromatic, or heterocyclic polyisocyanates as the starting component such as described, e.g., by W. Siefken in Justus Liebigs Annalen der Chemie, 562, pp. 75 to 136; for example those of formula $Q(NCO)_n$, wherein n is 2 to 4, preferably 2 to 3, and Q represents an aliphatic hydrocarbon residue having from 2 to 18, preferably from 6 to 10 C atoms, a cycloaliphatic hydrocarbon residue having from 4 to 15, preferably from 5 to 10 C atoms, an aromatic hydrocarbon residue having from 6 to 15, preferably from 6 to 13 C atoms, or an araliphatic hydrocarbon residue having from 8 to 15, preferably from 8 to 13 C atoms; e.g., such polyisocyanates as are described in DE-OS (German Offenlegungsschrift) 28 32 253, pp. 10–11. Particularly preferred are commercially readily available polyisocyanates, e.g., 2,4- and 2,6-toluene diisocyanate and mixtures thereof ("TDI"); polyphenyl-polymethylenepolyisocyanates which may be prepared by aniline-formaldehyde condensation and subsequent phosgenation ("crude MDI"), and polyisocyanates having carbodiimide, urethane, allophanate, isocyanurate, urea or biuret groups ("modified polyisocyanates"), particularly those modified polyisocyanates which are derived from 2,4- or 2,5-toluene diisocyanate and from 4,4- or 2,4-diphenylmethane diisocyanate, respectively.

Other starting components are compounds with at least two hydrogen atoms reactive towards isocyanate groups and with a molecular weight usually of from 400 to 10,000. In addition to compounds having amino, thiol or carboxyl groups, these are understood as compounds preferably having hydroxyl groups, in particular, compounds having from 2 to 8 hydroxyl groups, more specifically those having a molecular weight of from 1,000 to 6,000, preferably from 2,000 to 6,000, e.g., polyethers and polyesters as well as polycarbonates and polyesteramides having at least 2, usually from 2 to 8, preferably from 2 to 6 hydroxyl groups as are per se known in the preparation of homogenous and cellular polyurethanes and as described, e.g., in DE-OS 28 32 253, pp. 11–18. For use in the process according to the invention, polyesters having at least two hydroxyl groups are preferred.

Optionally, as other starting components, compounds are used having at least two hydrogen atoms reactive towards isocyanates and with a molecular weight of from 30 to 400 which likewise are to be understood as compounds having hydroxyl, amino, thiol and/or carboxyl groups, preferably compounds having hydroxyl and/or amino groups which may serve as chain extenders and cross-linkers. Generally, such compounds have from 2 to 8, preferably from 2 to 4 hydrogen atoms reactive towards isocyanates. Examples are described in DE-OS 27 32 292, pp. 21–24.

Water and/or volatile organic substances or gases liberated during reaction such as nitrogen may be used as blowing agents to obtain the foam structure.

Optionally, auxiliary agents and additives are co-used, for example:

Catalysts, surface-active additives such as emulsifiers and foam stabilizers, reaction retarders such as, for instance, acidic substances such as hydrochloric acid or organic acid halides, furthermore, common cell regulants, paraffines, fatty alcohols or dimethylpolysiloxanes, as well as pigments or dyes and familiar fireproofing agents, e.g., tricresyl phosphate, furthermore, stabilizers effective against aging and weathering influences, plasticizers and substances active as fungistatics and bacteriostatics, as well as fillers such as barium sulfate, kieselguhr, carbon black or prepared chalk. Examples for optionally co-used auxiliary agents and additives are described, for instance, in DE-OS 27 32 292, pp. 21–24.

Further examples of surface-active additives and foam stabilizers as well as cell regulants, reaction retarders, stabilizers, flame-retarding substances, plasticizers, dyes, and fillers, as well as substances active as fungistatics and bacteriostatics optionally to be co-used in the process of the invention, as well as details concerning mode of use and action of these additives can be inferred from Kunststoff-Handbuch Vol. VII (Ed.: Vieweg and Höchtlen), Carl-Hanser-Verlag, Munich, 1966, e.g., on pp. 103–113.

To operate the process of the invention for preparing polyurethane foams, the reaction components are reacted according to the known one-step, prepolymer or semi-prepolymer process wherein machine equipment is frequently used, e.g., such as described in U.S. Pat. No. 2,764,565. Details about processing equipment which may be used in the process of the invention are described in Kunststoff-Handbuch Vol. VII (Ed.: Vieweg and Höchtlen), Carl-Hanswer-Verlag, Munich, 1966, e.g., on pp. 121–205.

The centrifuge arrangement within a commercial Universal Block Transport high pressure foaming plant (Hennecke) is illustrated in FIG. 1 (Functional Diagram TDI-Degassing-Gassing). It can be seen that two different isocyanates (TDI 65 and TDI 80) can be supplied to mixing chamber 10 through supply lines 12 and 14. Separate centrifuges 16 and 18 are provided for the isocyanates. The treated isocyantes exiting the centrifuges are carried through lines 20 and 22 to the respective supply lines 12 and 14. The gas pressure in the centrifuges is controlled through gas feed line 24 and vacuum line 26. The other components used in producing the foam are supplied to mixing chamber 10 through supply lines which are not illustrated in FIG. 1.

Figure 2:
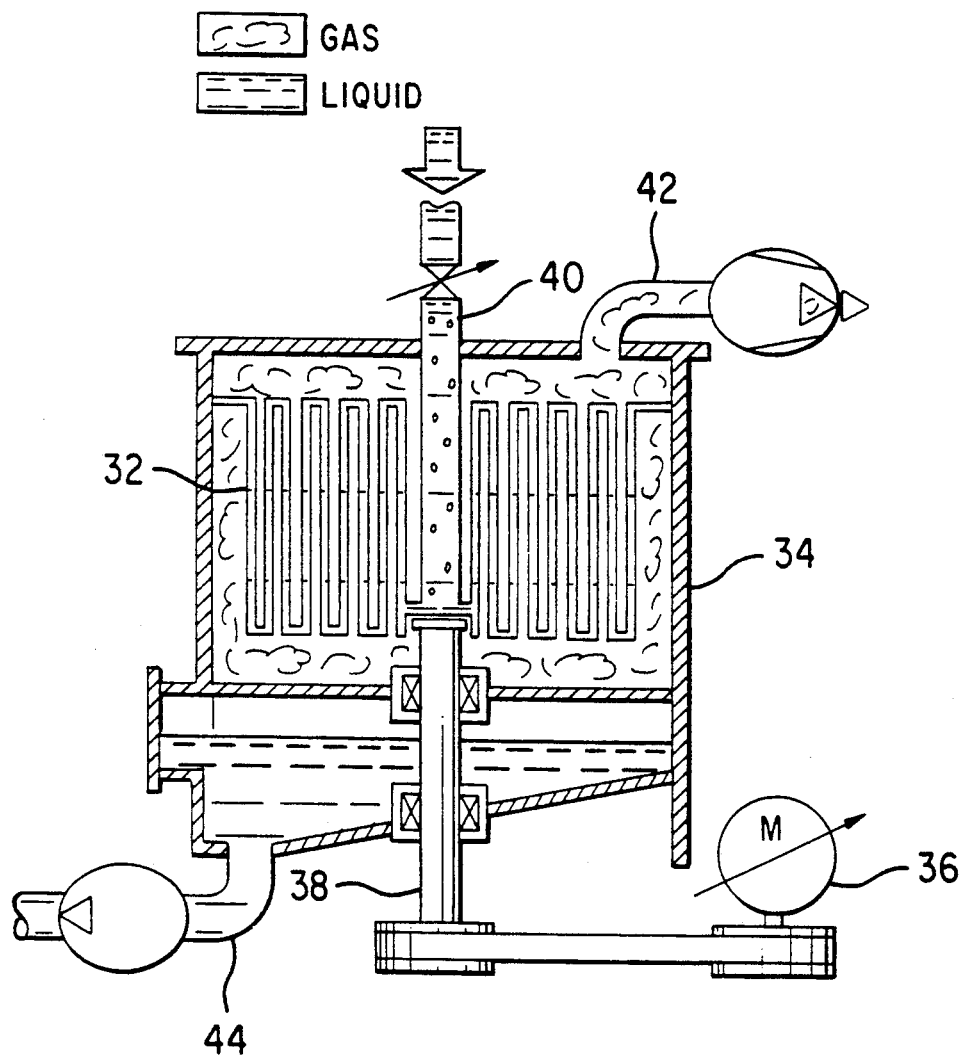
FIG. 2 is a sectional view of a centrifuge useful in controlling the gas content of the isocyanate according to the present invention.

The construction of an example of a useful centrifuge for creating a thin film of isocyanate which can be gassed or degassed is shown in FIG. 2. Originally, such centrifuges were developed for degassing of liquids and destruction of foams.

Chamber 32 composed of coaxial rings is rotatably mounted in housing 34, and is driven by motor 36 through shaft 38. The isocyanate to be treated is fed into the middle of chamber 32 though line 40, and successively passes the coaxial chambers from bottom to top or vice versa. Any liberated gas escapes, emerges from the degassing openings and is removed from the centrifuge through line 42 using a vacuum pump. Similarly, a gas supply line is provided to the centrifuge (not shown in FIG. 2— see line 24 in FIG. 1). Treated isocyanate is removed from the centrifuge via line 44.

Now, surprisingly, it has been determined that under the same conditions rapid and uniform gassing is possible as well as the degassing, thus permitting the present invention to control the gas content of the isocyanate closely to desired levels, thereby providing close control over the cell number in the foam. Another advantage of this process embodiment is that by varying the centrifuge speed, film thickness and residence time may be varied so that both degassing and gassing can be varied extensively. Particularly surprising was the finding that the degree of gassing or degassing can be adjusted reproducibly and thus, prior to beginning of production, the cell number can be predetermined within relatively narrow limits. During production, the desired cell number is controlled via gas content of the isocyanate which in turn is controlled primarily by the gas pressure in the centrifuge. All the other parameters such as injection pressure, mixing chamber pressure and even centrifuge speed are maintained constant depending on production conditions desired.

Accordingly, in order to obtain particularly coarse-pored foam, degassing is done at very low gas pressure, whereas, in order to obtain particularly fine-pored foam, degassing is done at excess pressure. Having selected a formulation, control of the cell size of a polyurethane foam is achieved via centrifuge operating pressure.

It goes without saying that the process of the invention may be employed for any of the various types of polyols on the one hand and isocyanates on the other hand. As discussed previously, the isocyanate, toluene diisocyanate (TDI) is used above all, but other isocyanates also may be used in the process of the invention.

In order to increase or reduce the gas content in the isocyanate it may be sufficient in some cases to degas or gas just a partial flow of material employed and then, prior to entering the mixing chamber, homogenously mix the partial flow with the unchanged main flow. This embodiment will be the one of choice in cases where foams of medium cell number are to be produced on a large scale and correspondingly large amounts of isocyanate must be adjusted with respect to gas content.

In the simplest case, air may be used as the gas for gassing. However, it is possible in principle to perform gassing and degassing using an inert gas such as nitrogen or carbon dioxide.

The advantages of the process of the invention over hitherto performed process measures are clear. For example, costs for failure batches during plant start up drop to a fraction. It is no longer necessary to adjust the injection pressure and/or mixing chamber pressure at extreme ranges possibly resulting in sealing problems, reduced production capacity and increased wear of the injection pumps. The continuous control of the invention operates almost instantly so that when the cell number is monitored appropriately, further failure batches may be avoided. Variations in gas content of the supplied raw materials can be balanced easily since the desired gas loading is effected independently of the original gas content. Finally, it is possible to grossly vary the cell number even during production and without interrupting production thereby being capable of meeting various customers' demands with respect to cell number in the form of relatively small batches.

Finally, according to the invention, it is even possible to produce not only open-cell but also closed-cell polyurethane foams by varying other parameters. Thus, it is a process that can be utilized very generally and for various purposes.

The present invention is illustrated by the examples given below without limiting the scope of protection of this invention to these examples.

EXAMPLE 1

In a plant like that of FIG. 1, using a centrifuge like that of FIG. 2, a reaction mixture consisting of

| | |
|---|---|
| 100 parts by weight | of a partially branched polyester having an OH number of 60, based on adipic acid, diethylene glycol and trimethylolpropane, |
| 4.0 parts by weight | of water, |
| 0.7 parts by weight | of a tertiary amine activating mixture (Desmorapid DB, Bayer Ag), |
| 0.3 parts by weight | of a tertiary amine activating mixture (Niax A 30, UCC), |
| 1.4 parts by weight | of stabilizer B 8300 (Th. Goldschmidt, silicone-based), |
| 51 parts by weight | of a mixture consisting of 44 wt.-% of a mixture of 80 wt.-% of 2,4- and 20 wt.-% of 2,6-toluene diisocyanate and 50 wt. % of a mixture of 65 wt.-% of 2,4- and 35 wt. % of 2,6-toluene diisocyanate, | is foamed into a block being 52 cm in height, 6,000 cm in length and 140 cm in width. In production, the centrifuge is run at an average rotational speed of 1,500 rpm; operating pressure in case A is 600 mbars and in case B 200 mbars. The mixing chamber (MK) pressure is 2.0 bars in both cases; the operating pressure of the toluene diisocyanate (TDI-P) is 65 bars.

In case A, the foam has a cell number of 45 ppi, while in the case B, a cell number of 25 ppi is determined.

EXAMPLE 2

The cell number of a polyurethane foam is 90 ppi; it was prepared according to the following formulation and machine adjustment given below:

| | |
|---|---|
| 100 parts by weight | of a polyester according to example 1, |
| 2.1 parts by weight | of water, |
| 1.0 parts by weight | of a tertiary amine activating mixture (KST 100, UCC), |
| 1.4 parts by weight | of stabilizer according to example 1 are processed according to example 1 with |
| 35.5 parts by weight | of the polyisocyanate mixture of example 1 to give a foam block. |
| Machine adjustment is as follows: | |
| Centrifuge rotational speed: | 1500 rpm |
| Centrifuge operating pressure: | 1500 mbars |
| Mixing chamber pressure: | 2.4 bars |
| Operating pressure TDI: | 80 bars |

EXAMPLE 3

| | |
|---|---|
| 100 parts by weight | of a polyether polyol trifunctionally modified with ethylene oxide and having an OH number of 46, |
| 4.5 parts by weight | of water, |
| 0.1 parts by weight | of a tertiary amine activator (Polycat 77, Air Products), |
| 0.2 parts by weight | of dimethanolamine, |
| 1.0 parts by weight | of stabilizer B 2370 (Th. Goldschmidt), |
| 0.13 parts by weight | of tin (II) octoate |
| 51.0 parts by weight | of a mixture consisting of 80 wt.-% 2,4- and 20 wt.-% of 2,6-toluene diisocyanate | are foamed into a block.

Machine parameters were preselected as follows:

| | Case A | Case B |
|---|---|---|
| Centrifuge rotational speed: | 1500 rpm | 1500 rpm |
| Centrifuge operating pressure: | 200 mbars | 650 mbars |
| Mixing chamber pressure: | 1.3 bars | 1.3 mbars |
| Operating pressure TDI: | 80 bars | 80 bars |

From this, different cell sizes result. In case A, a cell number of 30 ppi results; in case B of 45 ppi.

Continuous control of cell number of the invention via gas content of the isocyanate merely requires monitoring the cell number and correcting deviations from the desired cell number by appropriate variation of gas content. Since it is possible in principle to measure the cell number automatically and continuously as well, these measured values may be utilized to automatically control the gas content.

Thus, with the process of the invention it has been possible for the first time to solve an old and fundamental problem in polyurethane foam production, namely providing pre-adjustable, reproducible and optionally variable cell number adjustment in continuously produced polyurethane foam strands, and what is more, in a hitherto unreached breadth of possible variations. Since this process may be performed without disturbing continuous production and without substantial increase in regular costs, substantial economic advantages result by avoiding waste and by the expanded range of products supplied.

What is claimed is:

1. A process for continuous control of cell number in the production of polyurethane foams from components including isocyanates, compounds having at least two hydrogens reactive with an isocyanate group, and water, where mixing the components is effected in a mixing head with adjustable injection pressure and adjustable mixing chamber pressure, characterized in that prior to entering the mixing head the gas content of the isocyanate is continuously increased or reduced.

2. The process according to claim 1, characterized in that increasing or reducing the gas content of the isocyanate is effected in a pressure chamber with adjustable excess and reduced pressure, through which chamber the isocyanate flows as a thin film.

3. The process according to claim 2, wherein the pressure chamber comprises a centrifuge having a chamber of several coaxial rings.

4. The process according to claim 1, wherein the compound having at least two hydrogens is a polyol.

5. Apparatus for continuous control of cell number in polyurethane foams, comprising:

a mixing head having adjustable injection pressure and adjustable mixing chamber pressure, the mixing head being provided with a source of water and a compound having at least two hydrogens which are reactive toward an isocyanate group; and a source supplying isocyanate to the mixing head, provided with means for continuously increasing or decreasing the gas content of the isocyanate prior to entering the mixing head.

6. The apparatus according to claim 5, wherein the means for continuously increasing or decreasing the gas content comprises a pressure chamber with adjustable excess and reduced pressure, through which the isocyanate flows as a thin film.

7. The apparatus according to claim 6, wherein the pressure chamber comprises a centrifuge having a chamber of several coaxial rings.

8. The apparatus according to claim 5, wherein the compound having at least two hydrogens is a polyol.

* * * * *